Jan. 8, 1963
P. A. BUSCH ET AL
3,072,349
STATOR WINDING APPARATUS
Filed Nov. 14, 1960
6 Sheets-Sheet 3
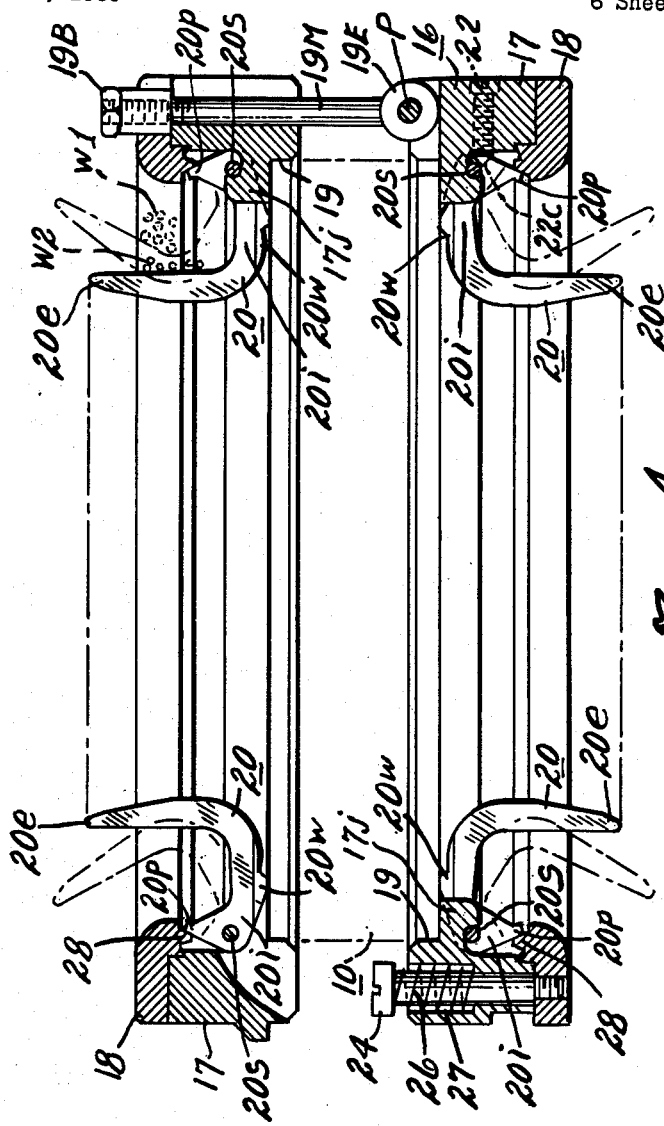
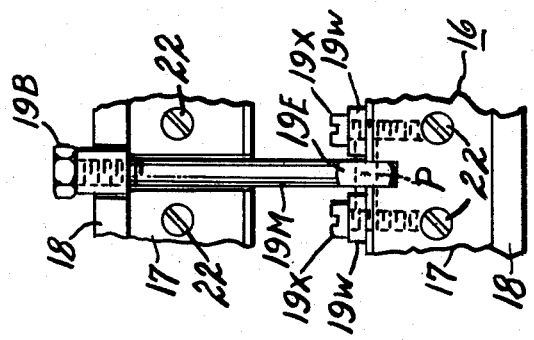
INVENTORS
PAUL A. BUSCH
ALBERT B. MEWHINNEY
FRANCIS E. WIRTZ
BY *Albert H. Reuther*
THEIR ATTORNEY INVENTORS
PAUL A. BUSCH
ALBERT B. MEWHINNEY
FRANCIS E. WIRTZ
BY Albert H. Reuther
THEIR ATTORNEY

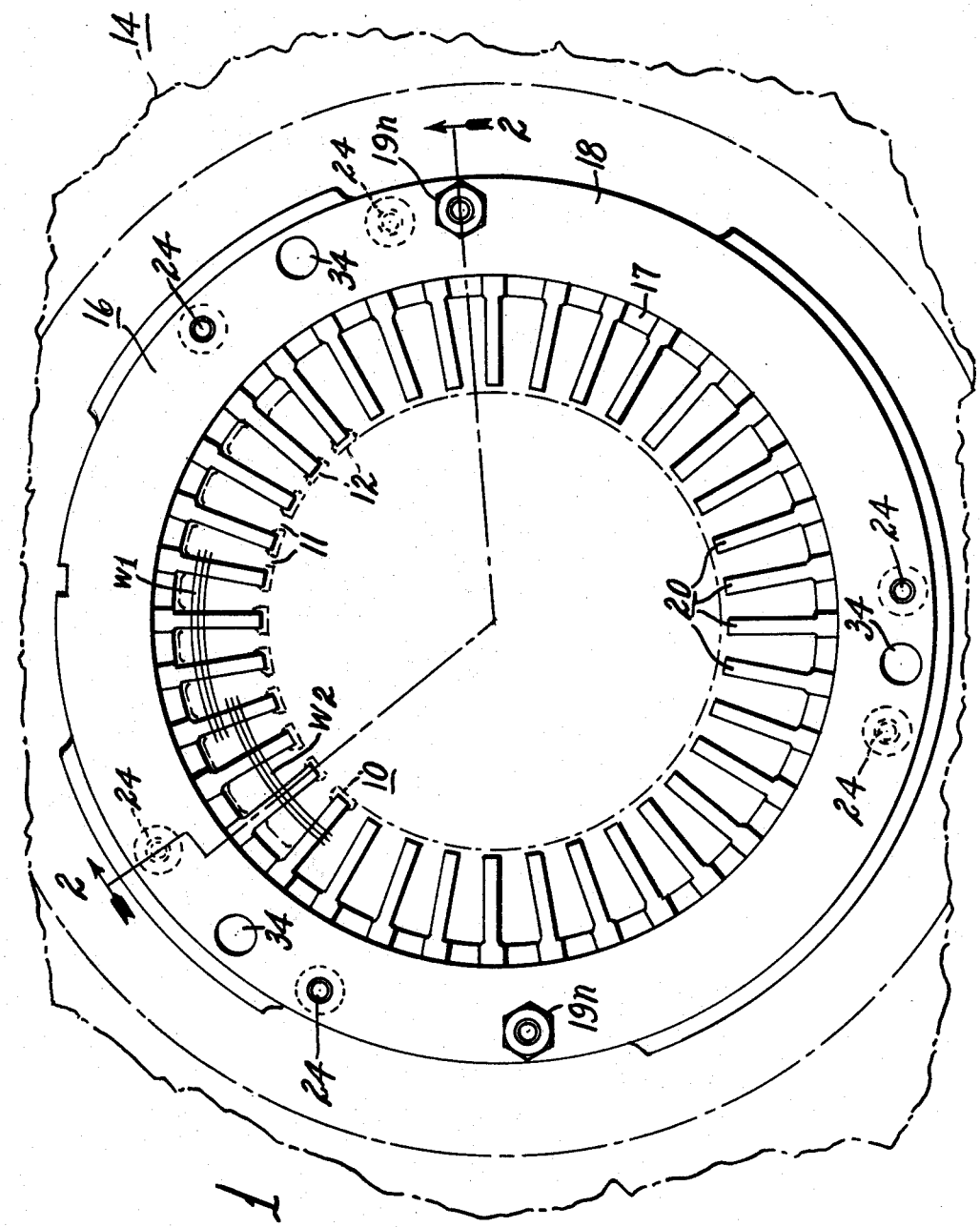

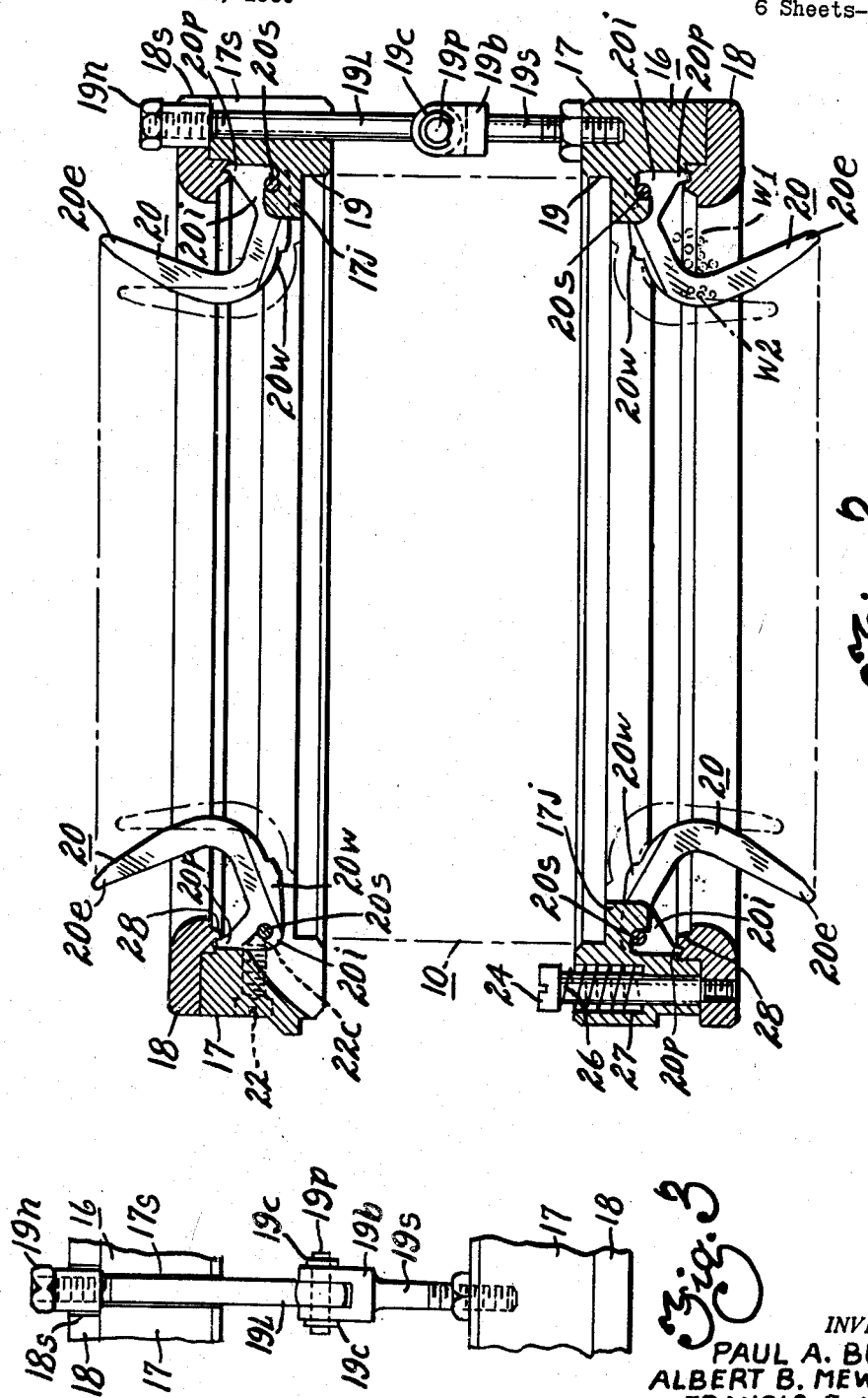

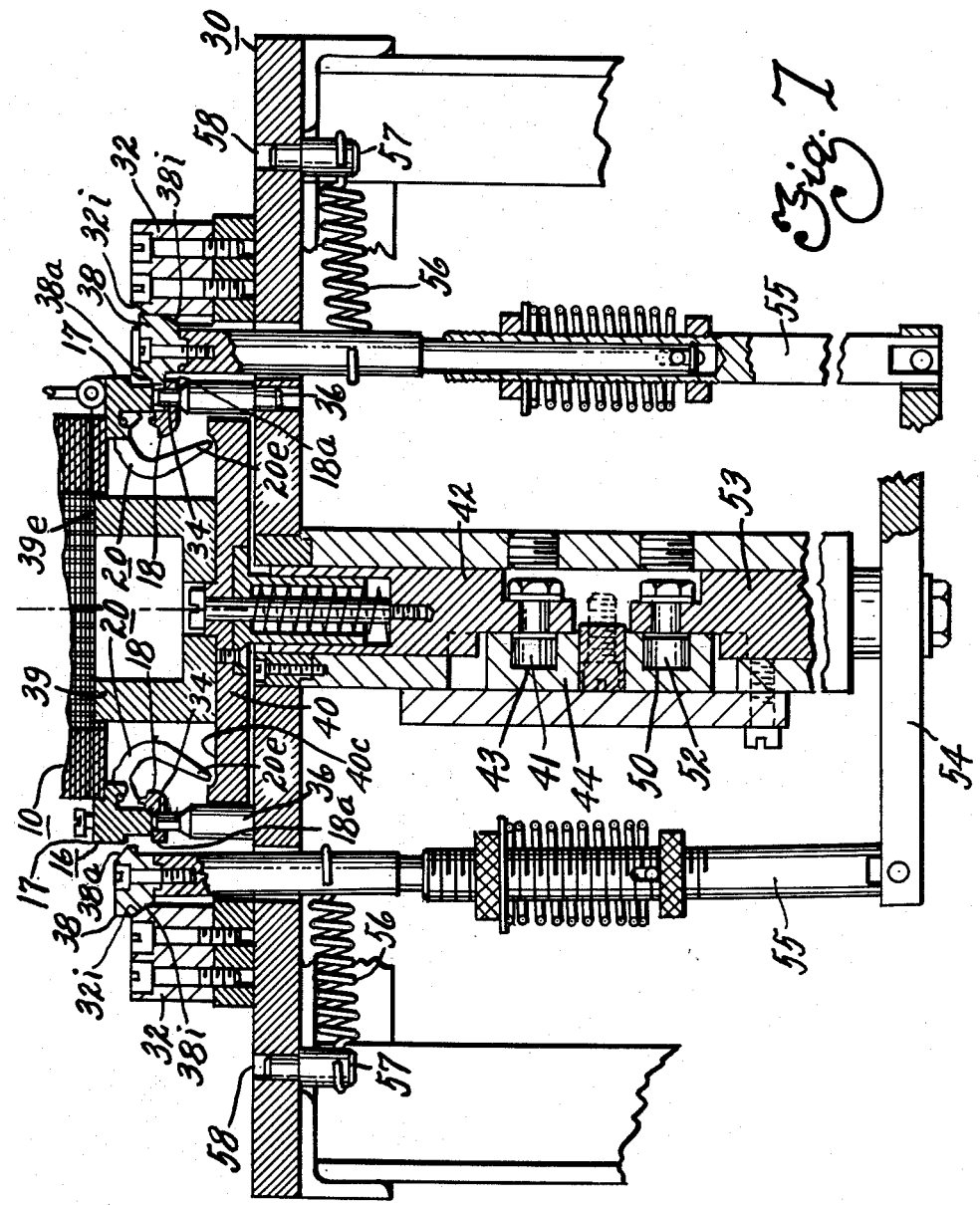

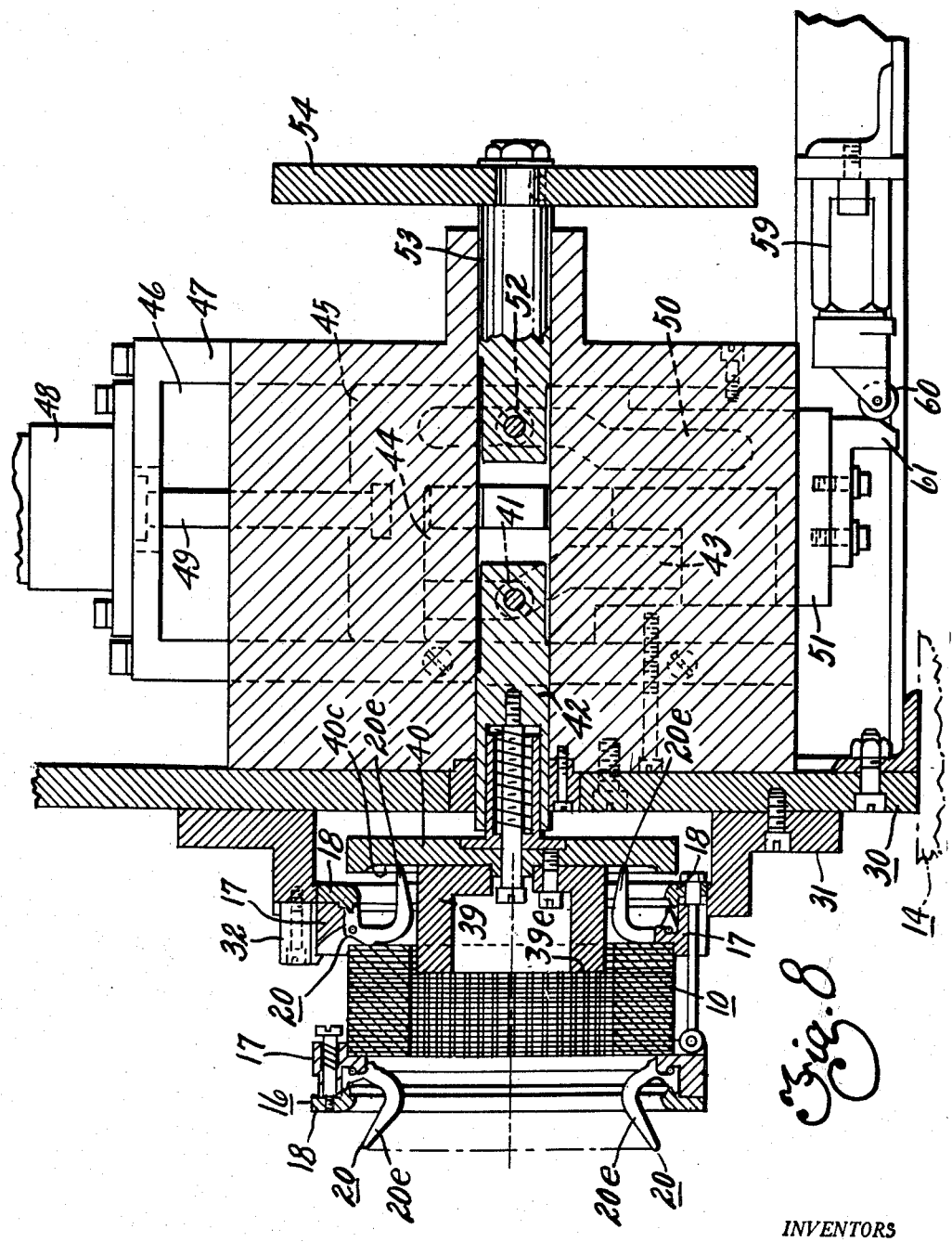

United States Patent Office 3,072,349
Patented Jan. 8, 1963

3,072,349
STATOR WINDING APPARATUS
Paul A. Busch, Albert B. Mewhinney, and Francis E. Wirtz, Dayton, Ohio, assignors to General Motors Corporation, Detroit, Mich., a corporation of Delaware
Filed Nov. 14, 1960, Ser. No. 69,057
5 Claims. (Cl. 242—1.1)

This invention relates to apparatus for winding stator means of a dynamoelectric machine and, particularly, to apparatus adapted to be used in efficiently effecting placement of more than a single layer of end turns of conductors into predetermined positioning on the stator means.

An object of this invention is to provide a new and improved stator conductor placement structure adapted to facilitate formation of end turns and to assure sufficient spacing for at least dual layers of end turns.

Another object of this invention is to provide stator winding apparatus combined with multi-position finger means journalled to a stator support means on the winding apparatus and engaged by conductors particularly along end turns during winding operation to assure sufficient spacing for predetermined dual layering of conductors of winding means.

Another object of this invention is to provide on a stator winding apparatus a pair of axially spaceable ring means, one of which carries a plurality of pivotal finger means each having a substantially elbow-shaped configuration, one end of which includes a projection adapted to abut against opposite sides of an annular shoulder of the other ring means such that the finger means can be maintained in either of two predetermined positions during winding of differing layers of stator coil end turns.

A further object of this invention is to provide a two-position captive-finger stator winding adapter assembled to include a plurality of pivotable substantially L-shaped members, each having an end projection engageable on opposite sides of a radially inclined abutment on an axially shiftable adapter ring which fits adjacent to an annular mounting means for pivotally journalling the L-shaped members which can be positioned therewith to assure sufficient spacing for stator end coil formation at differing depths.

Another object of this invention is to provide a two-position captive-finger stator winding adapter and fixture means for use with a stator winding apparatus that can place coils of wire in slots of an annular magnetic core fitted with slot liners of insulating material in each of a plurality of adjacent slots, there being a pair of axially spaceable ring means spring-biased into engagement with each other though one ring means carries a plurality of movable finger means, each having an end projection as well as a wedge portion to separate adjacent slot liners in at least one of two positions determined by engagement of each projection on either of opposite sides of shoulder means provided on the other of the ring means, each of the finger means including a free end which can extend axially away from the slotted stator core on each of opposite sides thereof and which can define a hook-like guide for coil end turn wire to be wound in a first layer when the projection engages the shoulder means to provide acute angular relationship between a stator core side and free end of the finger means and in a second layer when the projection engages another side of the shoulder means to provide substantially normal angular relationship between the stator core side and free end of the finger means on each of opposite axial sides of the core, there being a forced cocking of the finger means against the shoulder means by temporary shift of the ring means axially away from each other against spring bias to attain at least one positioning of the finger means.

Further objects and advantages of the present invention will be apparent from the following description, reference being had to the accompanying drawings wherein preferred embodiments of the present invention are clearly shown.

In the drawings:

FIGURE 1 is an elevational view of structure in accordance with the present invention to facilitate winding of a 36-slot stator core.

FIGURE 2 is a cross-sectional view taken along line 2—2 in FIGURE 1.

FIGURE 3 is a fragmentary side view of latching means provided to interlock structure of FIGURES 1 and 2.

FIGURE 4 is a cross-sectional view of structure in accordance with the present invention for use in machine winding of a 32-slot stator core.

FIGURE 5 is a fragmentary side view of latching means provided to interlock structure of FIGURE 4.

FIGURE 7 is a partially sectioned view taken along line 7—7 in FIGURE 6.

FIGURE 8 is a partially sectioned view taken in the direction of arrow 8 in FIGURE 6.

Figure 9:
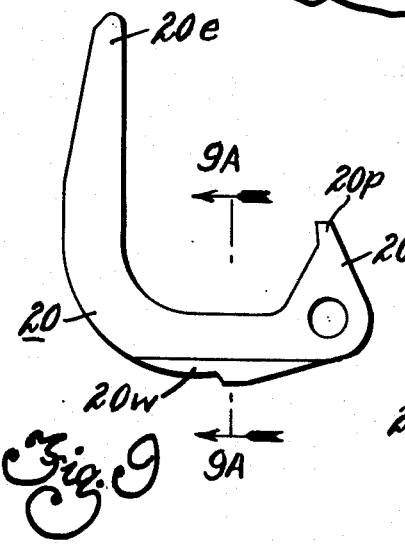
FIGURE 9 is a detailed side view of one of the finger means in accordance with the present invention.

FIGURE 9–A is a cross-sectional view taken through the finger means as indicated by line A—A in FIGURES 1 and 9.

Various machines have been devised for mechanically and automatically winding conductors or wires into slots of a magnetic stator core for use on dynamoelectric machines and the like. In some instances, there is difficulty in having such a machine position multiple layers of windings in slots that must be shared to accommodate predetermined conductors for wiring such as for winding a two-speed fractional horsepower motor to have certain desired electrical characteristics and performance within given limitations so far as size of a stator is concerned.

A Patent 2,304,520—Wirtz and Rodgers, belonging to the assignee of the present invention, discloses a winding machine of a type on which the apparatus or multi-position winding adapter can be used for example. Reference can be made to this Wirtz disclosure as to winding machine operation that effects feeding and placement of a conductor or wiring means as coils into a slotted stator core. The winding machine of the Wirtz patent includes a cage identified by reference numeral 54 therein on which a work-holder ring 75 is secured to support a slotted stator core in predetermined locations for placement of predetermined coils of wire therein. Previously, a plurality of stationary or rigid wire retaining fingers 86 having extensions 87 have been fastened such as by screws 81 as identified in the Wirtz disclosure. Such rigid or stationary fingers assure proper end turn formation but lack facility for use in placement of multiple layers of wiring at different depths as made possible by the present invention.

In FIGURE 1 of the drawings, there is shown a dynamoelectric machine stator core generally indicated by numeral 10 and having a plurality of slots 11 located radially and separated by teeth 12 in a well known manner. Each of these slots can be fitted with suitable insulating means such as slot liners so as to separate metal of the teeth 12 from conducting material or wiring identified by references W–1 as well as W–2 representing first and second layers of coils to be fitted into the slots 11 which are substantially filled to capacity thereby. Use of single position fixed or stationary finger means such as previously known would result in considerable difficulty so far as retention of wiring in the slots is concerned and so far as formation of proper layering of the windings is concerned. The slotted stator core illustrated in FIGURE 1 has a total of 36 radial slots therein and is mounted or retained with respect to a winding machine 14 having a work-holder such as a cage referred to earlier in which improved stator conductor placement structure or a multi-position captive-finger stator winding adapter means generally indicated by numeral 16 can be carried. This structure for adapter means 16 includes a first annular portion or first ring means 17 visible at least in part in FIGURES 1, 2 and 3 as well as a second annular portion or second ring means 18 also visible in these views and provided in substantially identical pairs on each of opposite sides or axial sides of the stator core 10. Each of the first ring means 17 includes an inner annular shoulder portion 19 wherein peripheral edges of the stator core 10 can be held in engagement. A plurality of movable guide or finger means generally indicated by numeral 20 can be seen assembled to the first and second ring means in FIGURES 1 and 2 as well as in FIGURE 4 and alone in detail in FIGURE 9. The structure of FIGURE 4 differs from that of FIGURE 2 with respect to the number of finger means such as 28 and with respect to a particular latching means provided to interlock and establish engagement of the plural ring means on each of opposite sides of a stator core. As indicated above, the stator core of FIGURES 1, 2 and 3 can have a plurality of slots totalling 36 slots whereas the center stator core with less iron or metal for depths illustrated in FIGURE 4 can be for a 32-slot embodiment requiring a fewer number of finger means such as 20 coinciding substantially with teeth such as 12 in corresponding numbers. The latching means of FIGURES 2 and 3 can include a pair of substantially diametrically located bolts or nuts 19n visible in FIGURE 1 also and threaded to one end of a link 19L journalled by a pin 19p to a bifurcated end 19b of a stud-like member 19s. The stud 19s is threaded to one of the first ring means 17 whereas the link 19L extends transversely through the other first ring means having a slot or passage 17s therein. The nut 19n threaded to the end of the link 19L fits complementary to a slot or undercut passage 18s as shown. The pin 19p can be retained with respect to the bifurcated portion 19b of the stud-like member 19s as well as one end of the link 19L by means of a pair of C-shaped spring clips 19c that can engage grooves adjacent to opposite ends of the pin 19p.

Similarly, the latching means of FIGURES 4 and 5 can include a pair of substantially diametrically opposite nuts such as 19B threaded to one end of a pivotal member 19M having an eyelet end 19E journalled with respect to a pin P opposite ends of which are held in sockets defined by one of the first ring means 17 and a pair of washer-like elements 19w each held in place by a cap screw 19x visible in FIGURE 5.

Finger means 20 of each of the assemblies include free ends 20e as well as a tapered or wedge portion 20w visible in FIGURES 2, 4, 9 and 9A for the purpose later described. Each finger means 20 further includes an intermediate portion 20i suitably apertured to receive a pin or shaft portion 20s which extends transversely relative to the intermediate portion 20i. It is to be understood that each of the finger means 20 such as illustrated in FIGURE 1 is to include such a shaft portion and each shaft portion is journalled relative to a radially inwardly extending J-shaped flange portion integral with the first ring means and identified by reference 17j. This J-shaped portion can be seen in FIGURES 2 and 4 and each shaft is retained in engagement with the J-shaped portion 17j by a set screw and the like such as 22 having a conical end 22c visible in FIGURES 2 and 4 and engaging a periphery of the shaft 20s about which each finger means 20 can pivot.

Due to pulling force between the finger means and wire during winding operation, a predetermined number of set screws substantially equalling the number of finger means should be provided.

Figure 9A:
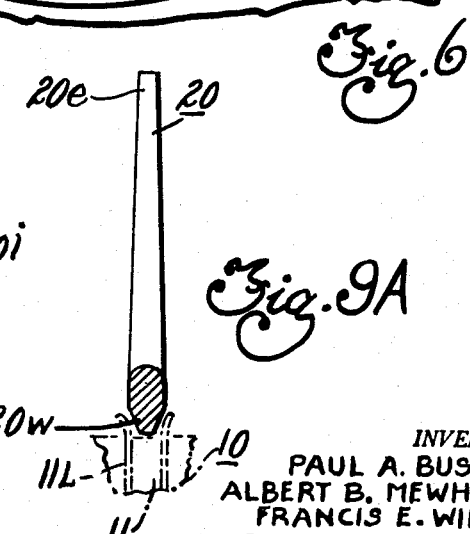

The first and second ring means 17 and 18 on each of opposite sides of the stator means 10 are coupled to each other in pairs by a spring biasing means including a cap screw or fastening means 24 visible at least in part in views of FIGURES 1, 2 and 4. One end of each cap screw 24 is treaded into a second ring means 18 and a concentric coil spring 26 that fits into a socket 27 of the first ring means 17 and engages the head or cap of screw 24 biasing the first ring means 17 resiliently against the second ring means 18 as shown in the drawings. Simultaneously this biasing action effects latching or locking of a projection 20p on either of opposite sides of an annular shoulder means or axially extending flange-like abutment 28 which is integral with the second ring means 18. As a result of engagement of projection 20p on either of opposite sides of this abutment 28, it is possible to have the finger means 20 maintained in dual positions wherein a first coil means having end turns located substantially radially outwardly adjacent to opposite sides and axially of the stator 10 can be formed. For both the 36-slot and 32-slot embodiments, the finger means 20 can have this dual positioning as indicated in the views of FIGURES 2 and 4. However, for purposes of illustration, the finger means 20 are illustrated by solid lines in their first position in FIGURE 2 as well as in phantom representing the second position in FIGURE 2. Further, for illustration, in FIGURE 4 the finger means such as 20 are illustrated in full in their second position and in phantom in their first position. It is apparent that while the finger means 20 are in their first position such that ends 20e thereof are substantially at an acute angle with respect to the opposite sides of the stator 10, the coil windings W-1 will be formed in a location radially farther out from the axial center line of the stator means 10. Thus, when the positioning of the finger means 20 is changed to the second position wherein the free ends 20e thereof are substantially at right angles to the opposite sides of the stator means 10, there is sufficient space in which a second layer of coil windings W-2 can be machine wound in a location radially inside the first layering of coil windings W-1. When each of the finger means 20 is in its second position having ends 20e substantially normal to the opposite sides of the stator 10, it is apparent that the wedge portion 20w as pivoted about the axis of shaft 20s will be touching a side or end lamination of the stator means 10, and the wedge portion 20w will serve to separate adjacent slot liners 11L as indicated in FIGURE 9A. The wedge portion 20w extends substantially for the length of one side of the elbow or L-shaped finger means 20 as visible in FIGURE 9. The finger means 20 summarily define a hook-like guide for coil end turn wire to be wound in a first layer when the projection 20p engages the shoulder means or abutment 28 in a radially outer location and in a second layer when the projection 20p engages an opposite side of the shoulder means located radially inwardly to provide substantially normal angular relationship between the stator core side and free end of the finger means. Angular difference in positioning of the finger means 20 held captive with respect to dual axially separable first and second ring means provides sufficient spacing for placement of coil windings in multiple layers because when the fingers are cocked in the first position there is a greater pull-down of the conductors or wiring which a winding machine having a shuttle, for example, can place relative to a stator core.

Figure 6:
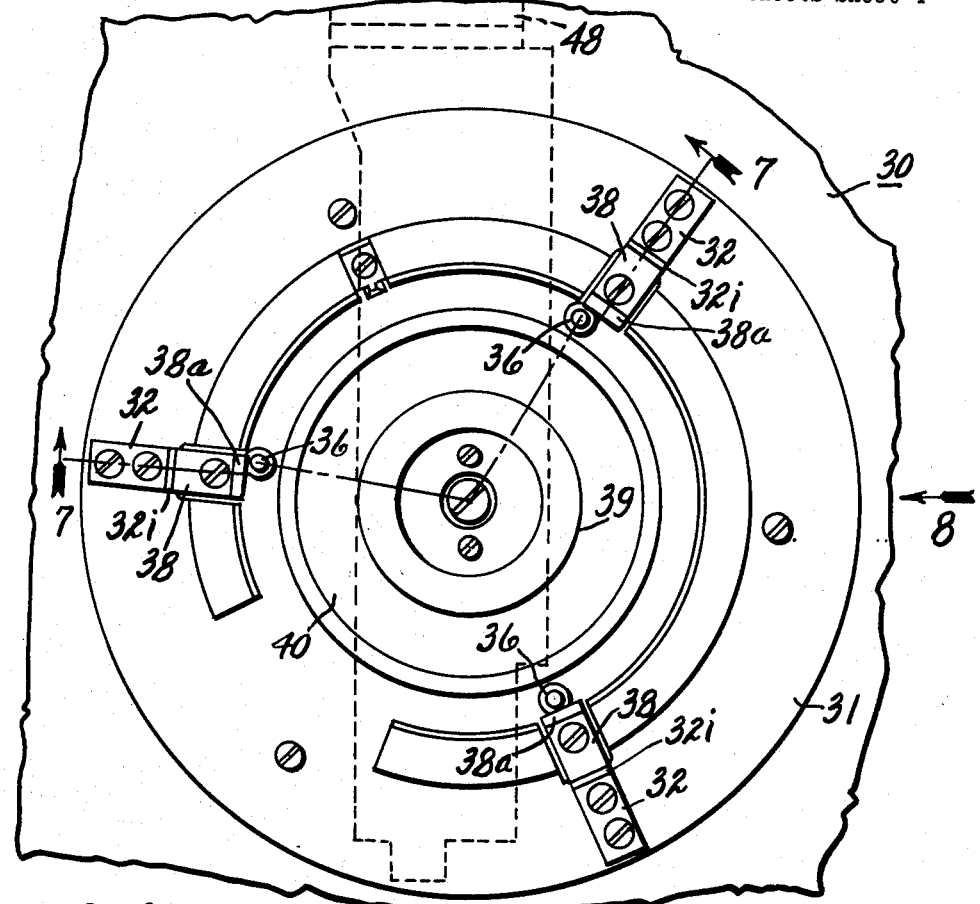
FIGURE 6 is a plan view of fixture means for use in adjustment of dual positioning of finger means with respect to shoulder means on one of a pair of axially adjacent ring means in accordance with the present invention.

It is to be understood that the coil springs 26 are relatively stiff and thus though there is a resilient biasing, considerable force is required to effect axial displacement of the first and second ring means 17 and 18, respectively, for a distance sufficient to permit relocation of projections 20p of the finger means 29 along an incline radially inside the shoulder means or abutment 28. FIGURES 6, 7 and 8 illustrate a fixture having fluid for pneumatically operated components to accomplish axial displacement of the ring means away from each other for a distance sufficient to permit shift of the projections 20p to opposite sides of the shoulder means or abutment 28. FIGURE 6 illustrates a plan view of a fixture generally indicated by numeral 30 having an annular work support 31 provided with at least three projections 32 each having an incline 32i adjacent to one corner thereof. Each of the second ring means 18 has at least three apertures 34 therein visible in FIGURES 1 and 7 and adapted to have posts 36 mounted on the fixture 30 project through these passages 34 and engage the first ring means 17 on one side as visible in FIGURE 7. A left portion of the view of FIGURE 7 represents engagement of these posts 36 against the first ring means 17 and also shows a hook means or end portion 38 having an abutment 38a movable into engagement with an edge 18a or abutment of the second ring means 18 as illustrated in a right-hand portion of the view of FIGURE 7. Thus, the posts 36 maintain the first ring means 17 in a fixed position while the end portions 38 having an incline 38i slidable along the incline 32i of projections 32 will effect axial separation of the second ring means 18 to one side of the first ring means 17, thereby permitting the projections 20p of the finger means 20 to be moved to an opposite side of the shoulder means for abutment 28 of the second ring means 18. A left-hand portion of FIGURE 7 shows the finger means 20 in the first position and a right-hand portion of FIGURE 7 shows the ring means 17 and 18 displaced from each other while a lower right finger in FIGURE 8 represents the finger means 20 shifted to the second position wherein the ends 20e are normal to the side of the stator core 10 while rings 17—18 are apart and an upper right finger in FIGURE 8 illustrates the finger means 20 locked into the second position by removal of the end portion such as 38 of FIGURE 7 from engagement with the second ring means 18. An arbor 39 journalled centrally on the fixture 30 has an end 39e adapted to fit concentrically inside the core as a mandrel assuring centering of the stator assembly while a pair of first and second ring means on one side of the two-position captive-finger adapter can be axially displaced from each other for shifting the finger means 20 in either of the two positions in accordance with the present invention. The arbor or mandrel 39 together with an annular disk secured thereto and identified by reference numeral 40 can be reciprocably moved such that a curved portion 40c of the disk will effect movement of the free ends 20e of each of the finger means 20 from the acute angular position first used to the second or normal positioning of the finger means as indicated in FIGURE 8. Movement of the mandrel or arbor 39 together with disk 40 is controlled by cooperation of a roller or follower 41 journalled on an extension 42 secured to the disk and arbor. The roller 41 follows a cam path governed by a substantially S-shaped groove 43 of a member 44 engaged by a piston-like slide 45 reciprocable inside a space 46 defined by a carriage 47 to which a fluid motor 48 is secured. The piston 45 is coupled to the fluid motor 48 by means of a rod or shaft 49 having an end that dovetails with the slide 45 as indicated in FIGURE 8. A differing cam slot 50 provided along an extension 51 of the slide 45 is cooperable with a roller 52 journalled on a shaft-like member 53 to which a plate 54 is secured as indicated in FIGURE 8. Reciprocable movement of plate 54 effects corresponding movement of rods 55 which can be axially adjustable in length and which carry the end portions 38 having inclines 38i cooperable with the stationary inclines 32i for operation described earlier. These rods 55 are biased normally radially outwardly by spring means or coil springs 56 having one end hooked around rods 55 and an opposite end secured to an anchor 57 or dowel which is press-fitted into apertures 58 of the fixture 30. A pivotal connection between plate 54 and each of the rods 55 can be provided at an end of the rods remote from the end portion 38. Operation of fluid motor 48 forms no part of the present invention and actuation thereof is conventional as governed by suitable air valve means 59 and the like actuated by a roller 60 on one end thereof engageable with a projection 61 secured to extension 51 of the slide 45.

The illustrations of FIGURES 6, 7 and 8 are provided to explain one method of effecting axial displacement of the first and second ring means from each other. It is to be understood that other mechanical devices can be provided for effecting separation of first and second ring means from each other. The fixture and mechanism of FIGURES 6, 7 and 8 are operative to effect axial displacement of one pair of ring means at a time and a stator core 10 to which adapter means having dual pairs of ring means secured thereto can be turned over by anyone using the mechanism to effect axial displacement of pairs of ring means at a time.

FIGURES 9 and 9A illustrate the finger means 20 per se in accordance with the present invention and various details of these finger means have been set forth in the foregoing description.

While the embodiments of the present invention as herein disclosed constitute perferred forms, it is to be understood that other forms can be adopted.

What is claimed is as follows:

1. A stator conductor placement structure for use on a slotted magnetic stator core, comprising, a pair of axially spaceable first and second ring means on each of opposite sides of the stator core, a plurality of multi-position finger means journalled on one such ring means on each side, a projection on one end of each of said finger means, and a shoulder means on a remaining one of each pair of ring means for engagement by each said projection of said finger means, said projection of said finger means being adapted to engage opposite sides of said shoulder means to effect locking of said finger means to first and second angular relationship to each side of the stator core.

2. The structure of claim 1 wherein axially extending latching means interconnect said first and said second ring means on each of the sides of the stator core.

3. The structure of claim 1 wherein each of said finger means is pivotally journalled to be retained by one of said ring means and includes an intermediately located wedge portion to provide positive separation of adjacent slot liners of insulating material while maintained in at least one position.

4. A two-position captive-finger stator core winding adapter assembly, comprising, dual pairs of axially spaceable ring means, said pairs of ring means per se being separated by the stator core and the rings of each pair of ring means being spring-biased into engagement with each other, a plurality of movable finger means carried on one ring of each pair of ring means, a shoulder means extending axially on one other ring of each pair of ring means, and projections on said finger means and adapted to engage opposite sides along radially inner and outer locations of said shoulder means.

5. The assembly of claim 4 wherein said finger means each is pivotally secured to one ring of each pair of said ring means and coil springs maintain said rings of each pair axially biased together on each side of the stator core, said finger means including free ends variably positioned for radially differing layering of stator conductors placed in predetermined locations in accordance with engagement of said projections of said finger means in engagement with said shoulder means.

References Cited in the file of this patent

UNITED STATES PATENTS 2,967,672    Zwayer _____ Jan. 10, 1961